Dec. 13, 1966  F. A. ANGONA ETAL  3,292,140

SYSTEM FOR GENERATING SEISMIC SIGNALS

Filed June 21, 1963

FRANK A. ANGONA
FRETWELL G. CRIDER  *INVENTORS.*

BY

*Arthur F. Zobel*

ATTORNEY

United States Patent Office 3,292,140
Patented Dec. 13, 1966

3,292,140
SYSTEM FOR GENERATING SEISMIC SIGNALS
Frank A. Angona, Dallas, and Fretwell G. Crider, Arlington, Tex., assignors to Mobil Oil Corporation, a corporation of New York
Filed June 21, 1963, Ser. No. 289,524
6 Claims. (Cl. 340—7)

This invention relates to the production of seismic signals and more particularly to an improved system for generating seismic signals in water and has for an object the reduction of secondary pressure pulses generated in water subsequent to the generation of a primary pressure pulse for seismic purposes.

In seismic exploration of offshore geologic formations, seismic waves are produced by generating a primary pressure pulse in water. This may be done, for example, by initiating an explosion in water. The seismic signal is derived from the initial pressure pulse or wave resulting from the explosion. Normally, objectionable secondary pressure pulses also are generated subsequent to the initial pressure pulse. These secondary pressure pulses are caused by oscillation, that is by contraction and expansion, of a gaseous bubble generated as a result of the explosion. The bubble is formed from hot gases which result from the explosion and which expand against the pressure exerted by the water at the depth at which the explosion is initiated. As the bubble expands, its internal pressure decreases. Eventually, the bubble begins to collapse due to the hydrostatic pressure at the point of bubble formation. The bubble then contracts until normally it is stopped by the highly compressed gas in a bubble now of very small radius. At the minimum bubble radius, the gas pressure is large enough to generate an acoustical pulse which is known as the secondary pressure pulse. The expansion-contraction cycles continue in decreasing intensity until the bubble energy has been dissipated to the surrounding water.

The secondary pressure pulses are objectionable in that they are reflected from subsurface interfaces in a manner similar to that of the primary pulse and the arrival of the reflected secondary pressure pulse tends to mask or obscure the desired event on the seismic record. Furthermore, the secondary pulses may be directly transmitted to the recording system at the same time as the reflected primary pulse arrives thereby further confusing the record.

In accordance with the present invention, there is provided in combination with a marine seismic exploration system, an improved system for reducing the secondary pressure pulses generated in water subsequent to the production of a primary pressure pulse generated for seismic purposes. The exploration system includes a first means or source for initiating the generation in the water of a primary pressure pulse. A second means is provided for directing gas into the bubble formed to reduce the contraction of the bubble. The second means includes at least one conduit leading from a supply of gas and having an end thereof located at a position relatively close to the first means such that the end of the conduit will break into the bubble as the bubble expands. In the embodiment disclosed, the end of the conduit is spaced from the first means by a distance less than the maximum radius of the bubble formed. With this arrangement, the gas will be introduced into the bubble as the bubble expands to its maximum radius.

In a more specific aspect of the present invention, primary pressure pulses repetitively are produced and gas is continuously directed to a point adjacent the first means or source, whereby gas is introduced into each bubble formed.

For further objects and advantages of the invention, and for a more complete understanding thereof, reference may now be had to the following description taken in conjunction with the accompanying drawings wherein.

Figure 1:
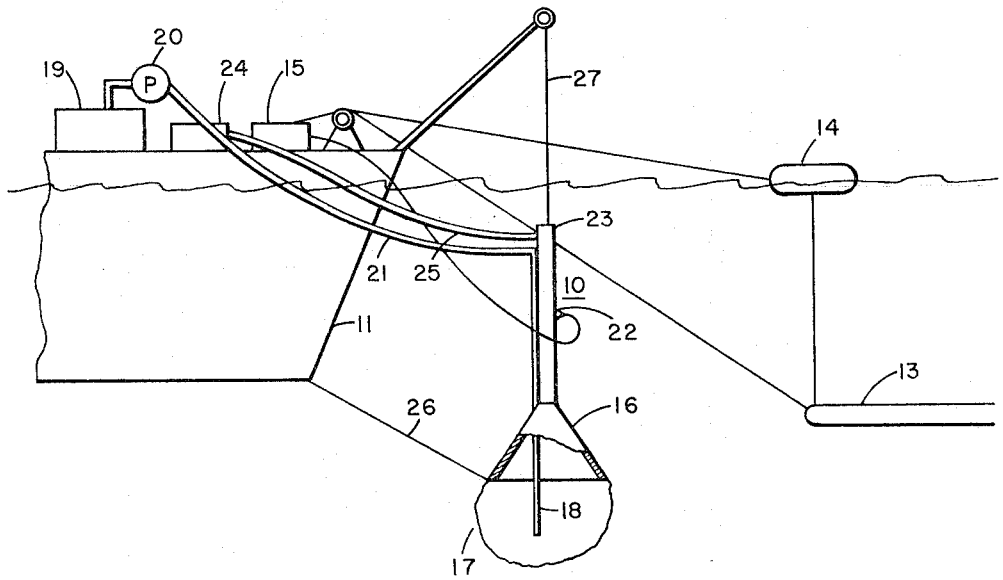
FIGURE 1 illustrates a system for producing improved seismic signals.

Referring now to FIGURE 1, there will be described a system for reducing secondary pressure pulses generated subsequent to the generation of a primary pressure pulse. The system includes a seismic source 10, coupled to a boat 11, for initiating in the water a primary pressure pulse for the production of seismic waves. Reflected seismic waves are detected by a seismic spread 13 supported by float 14 and applied to a recording system 15 including a recorder and a pulser as will be described. In the embodiment of FIGURE 1, the seismic source comprises a means for igniting explosive material which comprises combustible gases. Combustible gases are introduced into a reactor chamber 16 and ignited to produce an explosion, thereby producing a primary pressure pulse in water. The manner of ignition will be described hereinafter. As a result of the explosion, a gas bubble, illustrated at 17, is formed and expands to a certain radius. In accordance with the present invention, a conduit 18 is provided which leads to the surface to a supply of gas having a pressure in excess of the minimum pressure of the gas bubble formed, whereby gas is introduced into the bubble to prevent the bubble from contracting to a small radius where significant pressures are generated. Any further expansion-contraction cycles are restricted to slow oscillation of a large sphere. Pressure pulses which are generated are of low frequency and amplitude insignificant to seismic records. Moreover, by providing means for continuously injecting gas into conduit 18, a simple and reliable means is provided for reducing secondary pressure pulses resulting from seismic disturbances repetitively generated at short time intervals, for example, every six seconds as the boat traverses the water for the production of a continuous seismogram.

The end of conduit 18 may be positioned so that it breaks into the bubble just before the bubble expands to its maximum radius. At this time, the pressure in the bubble is nearly at a minimum thereby allowing gas to be readily injected into the bubble. In this manner, subsequent collapse of the bubble is prevented from taking place to the same extent as in normal contraction.

In one embodiment, a supply source 19 is provided for supplying gas under pressure into the conduit 18. The gas may be air or an inert gas, such as nitrogen. A constant delivery pump 20 delivers the gas through a flexible line 21 to the conduit 18, whereby a constant stream or flow of gas is delivered to the desired point spaced from the seismic source. In the system disclosed, the combustible gases are repetitively exploded as the boat 11 traverses the water for the production of the desired seismic record. As the bubble formed from each explosion expands, gas, continuously flowing from the end of conduit 18, will be introduced into each bubble thereby reducing contraction. Furthermore, the fact that the gases injected from supply 19 are cooler than the hot gases in the bubble aids in the reduction of contraction even more.

The maximum radius of the bubble can be determined from experiment or calculated from well-known equations. From this information the end of the conduit 18 can be located at the desired position relative to the bottom of the chamber 16. When the bubble has reached the maximum radius, the pressure in the bubble may be below the hydrostatic pressure of the water. This is due to the fact that, as the bubble expands, the pressure of the gases contained in the bubble decreases until eventually the gas pressure equals the hydrostatic pressure at the depth of explosion. The bubble, however, continues to expand beyond this point due to the inertial flow of water. During this phase of bubble expansion, the gas pressure drops below the hydrostatic pressure and eventually the hydrostatic pressure stops the outward water flow.

Figure 2A:
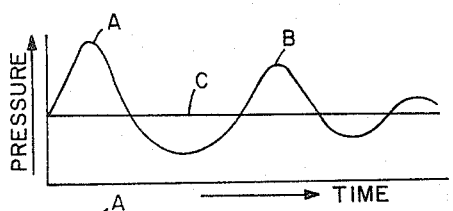
FIGURES 2A and 2B illustrate traces useful in understanding the invention.
Figure 2B:
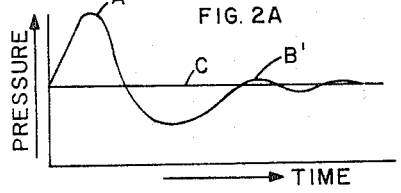

The normal increase and decrease of the pressure in the water as the result of an explosion is illustrated in FIGURE 2A. The peak at A illustrates the primary pressure pulse and the peak at B illustrates a secondary pressure pulse. The reference line at C is a measure of the hydrostatic head. FIGURE 2B illustrates the pressure generated with gas introduced into the bubble formed with the system of the present invention. As can be seen, the secondary pressure pulse illustrated at B' is substantially reduced.

The system for periodically igniting the combustible gases in reactor 16 comprises a pulser included in the recording system 15 and coupled to spark plug 22. In the operation of the system, combustible gases may be continuously injected into the flow tube 23 from supply 24 and conduit 25. The pulser periodically is triggered to actuate the spark plug 22 to ignite the gases in the flow tube, for example, every 3 or 6 seconds. When the gases in the tube 23 are ignited by the spark plug 22, a burning surface or flame front develops which travels downwardly to explode the gases in chamber 16. After each firing, the exhaust gases within the reactor chamber create a back pressure which prevents the fresh gases from immediately entering into the chamber. When the exhaust back pressure decreases, the fresh gases begin to flow into the chamber and flush the exhaust gases out into the water. A flow velocity of 61.5 standard cubic feet per minute has been found satisfactory for an igniter tube having an inside diameter of two inches and a reactor having a capacity of approximately five cubic feet. The combustible gases may be a stoichiometric mixture of butane-propane, air, and pure oxygen.

In one embodiment, the conduit 18 was welded to the outer surface of tube 23 and extended through the reactor 16 to a point three feet below the bottom of the reactor. The inside diameter of conduit 18 was one inch. Air was injected through conduit 18 at a rate of 20 standard cubic feet per minute. The gas under pressure in reactor chamber 16 prevents the gas from conduit 18 from entering the reactor. Thus, between explosions, gas from conduit 18 bubbles up around reactor 16 to the surface.

The seismic source 10 is suspended from the stern of the boat 11 by way of an arrangement including cables 26 and 27. A desirable depth of firing the source is between nine and twelve feet.

A suitable pulser and recorder arrangement, illustrated at 15, is disclosed in U.S. Patent No. 3,064,753, entitled "Repetitive Seismic Wave Source," of Carroll D. McClure.

Figure 3:
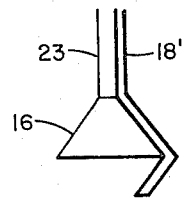
FIGURE 3 illustrates a modified seismic source which may be employed in the system of FIGURE 1.

Referring now to FIGURE 3, there is illustrated a modification wherein conduit 18' does not extend through the chamber 16, but is coupled to the outer surface of tube 23 and chamber 16 and is bent around the bottom edge of chamber 16 to the desired position below the bottom thereof. This arrangement has advantages in that the conduit 18' will not interfere with the combustion process inside the chamber.

Figure 4:
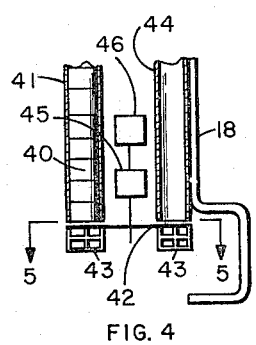
FIGURE 4 illustrates a further modification which may be employed in the production of seismic signals.
Figure 5:
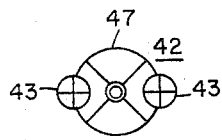
FIGURE 5 is a sectional view of a portion of the system of FIGURE 4 taken along the lines 5—5 of FIGURE 4.

As can be understood by those skilled in the art, the present invention can be applied to improve seismic signals produced by other types of systems. For example, the present invention is applicable to systems employing charges of solid explosives for producing primary pressures in water. Such a system is illustrated in FIGURES 4 and 5, as now will be briefly described. The system employs some of the same elements disclosed in FIGURE 1 and accordingly like elements have been given like reference characters. Charges of solid explosives 40 are stacked in conduit 41. A rotating member 42 having two metal baskets 43 rotates to deliver periodically charges from conduit 41 to initiating means 44. The means 44 may comprise a conduit similar to conduit 23 of FIGURE 1 wherein combustible gases are injected and periodically ignited by a spark plug. A wave front is created in conduit 44 which travels downwardly to initiate explosion of the charge positioned below the end of the conduit. As illustrated, gas flow tube 18 is attached to conduit 44 with the end thereof being located below the firing position to introduce gas into the bubble formed.

Rotating member 42 is driven by reduction gear 45 and motor 46 to deliver the charges under conduit 44 prior to the time that the wave front reaches the end of the conduit. The charges may be cylindrical-shaped and have a height equal to the depth of the baskets. Rim 47 keeps the charges in conduit 41 in place until the opening of the basket moves below the conduit. In one embodiment, the charges of solid explosives may have a heat-sensitive cap inserted in the top thereof. The wave front created in the conduit 44 explodes the cap to initiate explosion of the charge.

Having described the invention in connection with certain embodiments, it will now be understood that further modifications will suggest themselves to those skilled in the art and it is intended to cover such modifications as fall within the scope of the appended claims.

What is claimed is:

1. In a system for producing seismic signals useful in the investigation of underwater geologic formations, the combination which comprises first means for initiating the generation in water of a primary pressure pulse which results in the formation of an expanding gas bubble, and second means for directing gas into the bubble formed to reduce the contraction of said bubble, said second means including at least one conduit leading from a supply of gas and having an end thereof located at a position relatively close to said first means such that said end will break into said bubble as said bubble expands for the introduction of gas into said bubble.

2. In a system for producing seismic signals useful in the investigation of underwater geologic formations, the combination which comprises a seismic source for repetitively initiating the generation in water of primary pressure pulses each of which results in the formation of an expanding gas bubble, and means for directing gas into the bubble formed to reduce the contraction of said bubble, said last-named means including at least one conduit leading from a supply of gas and having an end thereof located relatively close to said source and spaced therefrom at a position such that said end will break into said bubble as said bubble expands for the introduction of gas into said bubble.

3. A system for producing seismic signals useful in the investigation of underwater geologic formations, comprising a first means for repetitively initiating the generation in water of primary pressure pulses each of which results in the formation of an expanding gas bubble, and second means for injecting gas into the bubble formed to reduce the contraction of said bubble, said second means including a gas supply means and conduit means for directing gas from said supply means to a point adjacent said first means for introduction into the gas bubble formed.

4. The system of claim 3 wherein said second means includes means for continuously injecting gas from said supply means into said conduit for continuous flow to said point adjacent said first means.

5. In a system for producing seismic signals useful in the investigation of underwater geologic formations, the combination which comprises a first means for initiating the generation in water of a primary pressure pulse which results in the formation of an expanding gas bubble, and second means for directing air into the bubble formed to reduce the contraction of said bubble, said second means including at least one conduit having a first end leading to the surface for receiving air and a second end leading to a point adjacent said source and spaced from said source for introducing air into said gas bubble at least when said bubble expands.

6. A system for producing seismic signals useful in the investigation of underwater formations comprising:
a first means for initiating the generation in water of a primary pressure pulse which results in the formation of an expanding gas bubble, and
second means independent of said first means for injecting gas into the bubble formed to reduce the contraction of said bubble,
said second means including a gas supply means and conduit means for directing gas from said supply means to a point adjacent said first means for introduction into the gas bubble formed.

References Cited by the Examiner
UNITED STATES PATENTS

| | | | |
|---|---|---|---|
| 2,599,245 | 6/1952 | Finn | 181—.5 |
| 2,619,186 | 11/1952 | Carlisle | 181—.5 |
| 2,994,397 | 8/1961 | Huckabay | 340—7 |

SAMUEL FEINBERG, *Primary Examiner.*

BENJAMIN A. BORCHELT, *Examiner.*

P. A. SHANLEY, *Assistant Examiner.*